(12) United States Patent
Oosterholt

(10) Patent No.: US 9,917,703 B2
(45) Date of Patent: Mar. 13, 2018

(54) PORTABLE CONTROL DEVICE FOR CONTROLLING PLAYBACK STREAMS IN DISTRIBUTED SYSTEM

(75) Inventor: Ronaldus Hermanus Theodorus Oosterholt, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 603 days.

(21) Appl. No.: 12/067,954

(22) PCT Filed: Sep. 21, 2006

(86) PCT No.: PCT/IB2006/053418
§ 371 (c)(1),
(2), (4) Date: Mar. 25, 2008

(87) PCT Pub. No.: WO2007/034431
PCT Pub. Date: Mar. 29, 2007

(65) Prior Publication Data
US 2008/0256590 A1 Oct. 16, 2008

(51) Int. Cl.
*H04N 7/18* (2006.01)
*H04L 12/28* (2006.01)
(Continued)

(52) U.S. Cl.
CPC ........ *H04L 12/282* (2013.01); *H04L 12/2838* (2013.01); *H04N 5/4403* (2013.01);
(Continued)

(58) Field of Classification Search
CPC .......... H04N 21/436; H04N 21/43615; H04N 21/43622; H04N 21/472; H04N 21/47217;
(Continued)

(56) References Cited

U.S. PATENT DOCUMENTS 5,592,482 A 1/1997 Abraham
7,194,755 B1 * 3/2007 Nakata et al. .................. 725/78
(Continued)

FOREIGN PATENT DOCUMENTS

EP 1365373 A2 11/2003
JP 10164449 A 6/1998

OTHER PUBLICATIONS

Richard Van De Sluis, et al: User Interface for an In-Home Environment, Human Computer Intertraction, Tokyo, Jul. 2001, pp. 383-390.
(Continued)

*Primary Examiner* — John Schnurr

(57) ABSTRACT

A distributed content rendering system has a distributed communication structure (14, 14*b*) coupled between a stream source and a rendering device. A remote control device of the system has a "most recent" button. Control information is gathered for one or more streams of which rendering has been most recently started anywhere via the communication structure (14, 14*b*) before actuation of the "most recent" button (160). When actuation of the "most recent" button (160) is detected in association with the rendering device (10), one of the one or more streams selected and the information is used to direct that stream at the rendering device (10) that is associated with the actuated.

12 Claims, 1 Drawing Sheet

Figure 1:
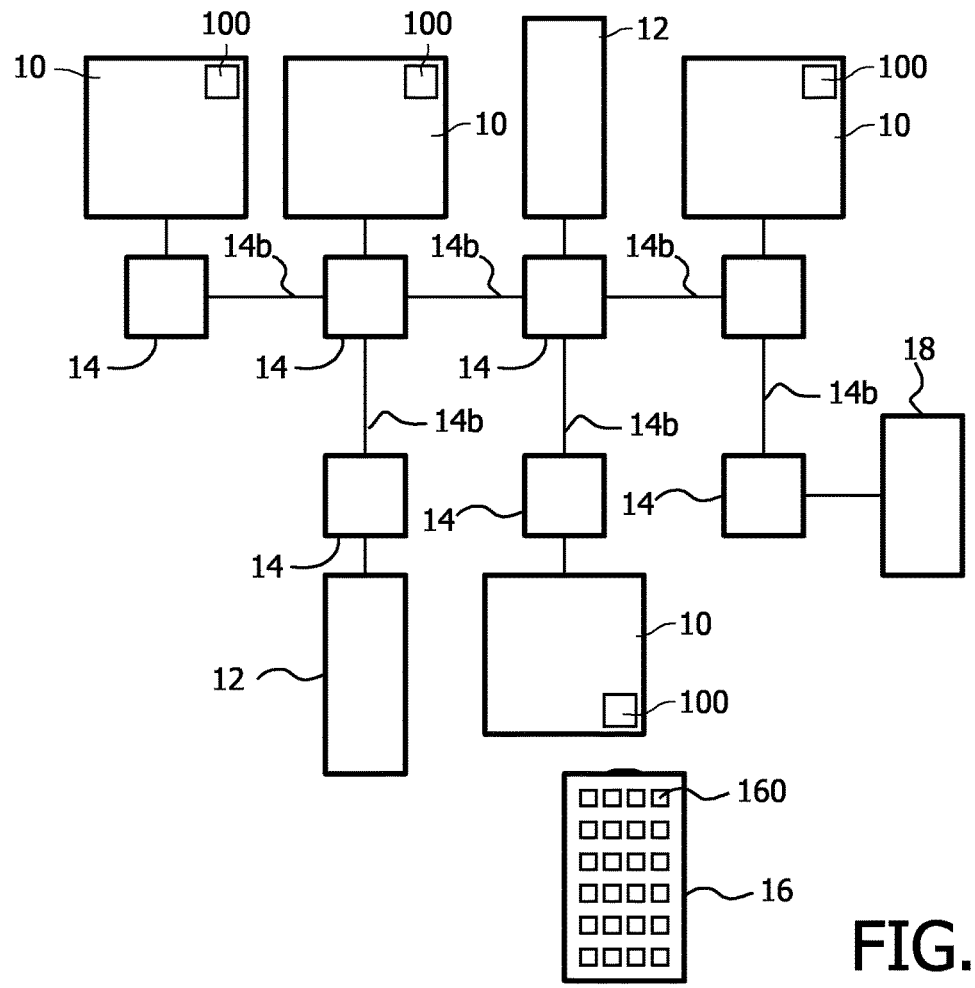

(51) Int. Cl.
*H04N 5/44* (2011.01)
*H04N 21/422* (2011.01)
*H04N 21/436* (2011.01)
*H04N 21/442* (2011.01)
*H04N 21/443* (2011.01)
*H04N 21/482* (2011.01)

(52) U.S. Cl.
CPC . *H04N 21/42204* (2013.01); *H04N 21/43615* (2013.01); *H04N 21/4433* (2013.01); *H04N 21/44222* (2013.01); *H04N 21/482* (2013.01); *H04L 2012/2849* (2013.01); *H04N 2005/4412* (2013.01)

(58) Field of Classification Search
CPC ....... H04N 21/42204; H04N 21/44222; H04N 21/4433; H04N 21/482; H04N 5/4403; H04L 12/282; H04L 12/2838; H04L 2012/2849; H04L 2005/4412
USPC .................................. 725/10, 74, 78, 86, 135
See application file for complete search history.

(56) References Cited

U.S. PATENT DOCUMENTS

| | | | |
|---|---|---|---|
| 7,619,972 B2* | 11/2009 | Gregory | ........................ 370/231 |
| 7,917,930 B2 | 3/2011 | Nakata et al. | |
| 8,230,456 B2* | 7/2012 | Jacoby | ............... H04N 7/17318 725/14 |
| 2001/0027561 A1* | 10/2001 | White | ................. H04N 7/17318 725/1 |
| 2003/0068155 A1* | 4/2003 | Vasilevsky et al. | ............ 386/52 |
| 2004/0098597 A1 | 5/2004 | Giobbi | |
| 2004/0104806 A1 | 6/2004 | Yui et al. | |
| 2005/0015805 A1 | 1/2005 | Iwamura | |
| 2006/0026279 A1* | 2/2006 | Zigmond | ............ H04L 12/2803 709/224 |
| 2006/0048184 A1* | 3/2006 | Poslinski | ............ H04N 5/44543 725/45 |

OTHER PUBLICATIONS

Evert J. Van Loenen, On the Role of Graspable Objects in the Ambient Intelligence Paradigm, Media Interaction Group, pp. 1-5.

* cited by examiner

PORTABLE CONTROL DEVICE FOR CONTROLLING PLAYBACK STREAMS IN DISTRIBUTED SYSTEM

The invention relates to a content rendering system. The invention also relates to a portable control device and a control structure.

A user interface for in-home video rendering has been described in an article titled "User Interface for an In-Home Environment" by Sluis, R. van de, Eggen, J. H., Jansen, J. and Kohar, H. in Hirose, M. (Ed.), Human Computer Interaction, INTERACT '01, Tokyo, July 2001, pp. 383-390. This article proposes an In-Home system that comprises a plurality of display screens disposed in different rooms of a house. The system supports a "follow me scenario" wherein a user is enabled to continue watching the same video program as he or she moves from one room to another.

The system contains a program stream source (a tuner, a DVD player or another type of replay device), the display screens and a communication structure to transmit the program stream from the source to any one of the display screens. To support the "follow me scenario, a "token" object is used, which the user carries along from one room to another. Detectors are provided to detect the location of the token object and to redirect a program stream that is associated with the program each time to the display that is associated with the location of the token object.

One disclosed implementation of a token is a remote control unit, which the user would have to carry along when moving from one room to another. Another implementation is a pen-like object, which is also carried along and placed for example in to a kind of vase in the room where the user wants to view the program stream.

One problem with this system is that users find it onerous to have to carry a special object from room to room, if only because users tend to forget to take the object or because it requires some searching to recover the object.

As an alternative the article proposes use of a "house map", which is an interface screen that shows a floor plan of the house with rooms wherein the respective program streams are indicated that are currently rendered in the respective rooms. To cause "follow" me, the user calls up the "house map" and "drags" the program stream from one room in the layout to another. In response the system starts rendering the stream in the room to which it was dragged. Such an interface can be too complex for a number of users.

Among others it is an object to provide for a content rendering system with a plurality of geographically distributed rendering devices wherein a follow-me feature can be realized with little overhead for the user.

There is provided a distributed content rendering system, comprising a content stream source, a rendering device, a distributed communication structure for coupling the rendering device to the stream source, a portable control device (16) for generating an actuation signal, a detection circuit (100) to detect the actuation signal (160) in association with the rendering device (16), and a control structure (18, 14,14*b*) configured to
a) gather via the communication structure (14, 14*b*) a control information for one or more streams of which rendering has been started before the detection of the actuation signal, and
b) activate rendering of one of the one or more streams, selected under control of the gathered control information of that one the one or more streams, directed at the rendering device (16) that is associated with the actuation signal.

The portable control device may be a handheld remote control device that has a "most recent" button or that incorporate a wireless transmitter for transmitting a device presence signal. For example, when the user activates the "most recent" button, this defines a stream or streams that have most recently been started anywhere in the system before actuation of the "most recent" button. A control structure of the system is configured to gather control information for at least one stream and use the control information to start a stream at a rendering device (e.g. a display screen and/or a loudspeaker) that is for example associated with the actuation of the "most recent" button. That is, the user does not have to generate the control signals that are normally required to identify the stream when starting the stream ab initio (by selecting a channel number or by navigating to an item from a DVD disk for example). Instead, for selecting the stream as used herein, implicit use is made of a previous identification anywhere in the system.

In one embodiment, rendering of the most recently activated stream is automatically started in response to activation of the "most recent" button, i.e. a broadcast television program is routed to the associated rendering device, or a stream from a replay device is routed to the associated rendering device. In another embodiment a list of the most recent streams is rendered at the associated rendering device in response to activation of the "most recent" button and the user is enabled to indicate a stream, after which the control structure uses the control information of the stream is used to activate rendering the indicated stream on the associated rendering device. As used here a rendering device is associated with the activation of the "most recent" button for example because the activation was detected in a room where the rendering device is located or because the remote control device was pointed at the rendering device during the activation.

Preferably, the system comprises a plurality of rendering devices. In this case control information for streams started most recently at any of the rendering devices is gathered and used to start a stream at the associated rendering device. Typically, starting the stream at the rendering device after activation of the "most recent" button involves redirecting an ongoing stream to the rendering device associated with the activation. Thus, transmission of a broadcast stream or replay from a storage device may continue, but at a different rendering device. Alternatively, starting of the stream may involve resumption of replay of a stream from a storage device from a point to which it was replayed in response to the previous start. Also preferably, the system comprises a plurality of content stream sources (e.g. one or more tuners for receiving broadcast signals, one or more replay devices such as optical or magnetic disk players etc.). In this case the control information for streams started most recently from any of the stream sources is gathered.

The control structure that controls use of the "most recent" feature may be a central control circuit of the system, or a control circuit include in the associated rendering device, or a collection of circuits that are distributed over different rendering devices and/or stream sources. In the case of a central circuit for example, the control structure may maintain a record of activation of different streams, overwriting a least recent activation in the record when a new activation occurs, and return the record upon activation of the "most recent" button. In the case of distributed circuits, each may record locally started streams and the records from different control circuits may be gathered in response to activation of the "most recent" button or upon a wireless receipt of the presence signal from the portable device. The gathered control information needs to be sufficient to generate a command signal for activating a selected stream. Although a complete command signal may be used as user information, it is usually sufficient to use only parameters for use in such a command as control information. "Button", as used herein encompasses pushbuttons with underlying switches, touch sensors, graphically simulated buttons and any other device that a user can use to indicate a selection.

Figure 2:
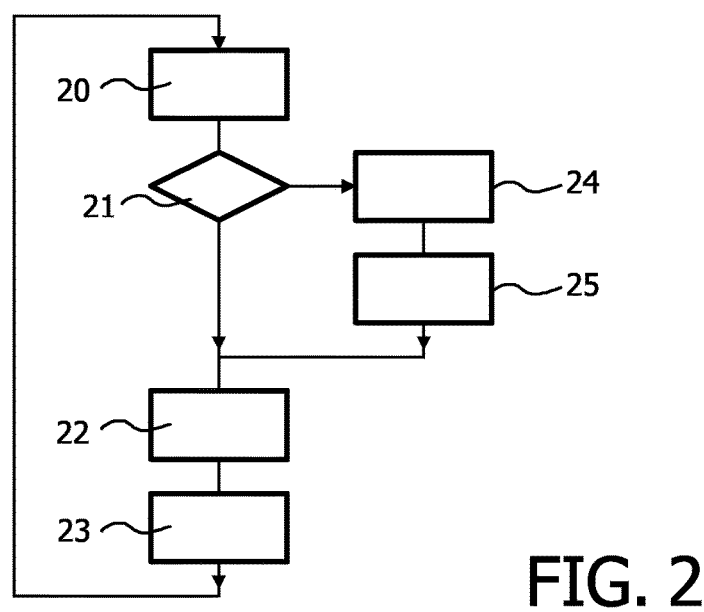

These and other objects and advantageous aspects of the invention will be illustrated using a description of exemplary embodiments, using the following figures FIG. 1 shows an example of a distributed system for rendering audio and/or video content;

FIG. 2 shows a flow chart of operation of the system.

FIG. 1 shows an example of a distributed video system. The system comprises display devices 10, stream sources 12, communication circuits 14, communication connections 14b, a remote control device 16 and a control circuit 18. Communication circuits 14 are connected to each other via communication connections 14b (although a tree of interconnections is shown, alternative forms of connection, such as a bus may be used). The display devices 10, stream sources 12 and control circuit 18 are coupled to respective ones of the communication circuits.

Each display device 10 is provided with a receiver 100 for remote control signals. Remote control device 16 (not shown to scale) is arranged to send control signals to a receiver 100 in response to activation of buttons on remote control device 16. One button 160 is a "most recent" button. Typically, each button overlies a switch (not shown) in remote control device 16, which is coupled to a transmission circuit (not shown) in remote control device 16, which causes transmission of a wireless signal when the switch is closed or opened. However, "button" as used herein is not limited to buttons with switches, for example, touch sensors coupled to a transmission circuit may be used instead.

The control circuit 18 may comprise a data processor, e.g. a well-known central processing unit (CPU) suitably arranged to implement the present invention and enable the operation of the device as explained herein.

FIG. 2 shows an embodiment with a flow-chart of the system operation. In a first step 20 the receiver 100 of a display device 10 receives a signal from the remote control device 16 and converts the signal into a command. In step 21 it is tested whether the command is the result of activation of the "most recent" button 160. If not, step 22 is executed wherein an action indicated by the command is performed, for example by sending a further command from the display device 10 to a selected stream source 12 to start transmitting a stream to the display device 10 that received the remote control signal. In step 23 it is tested whether the command involved starting a stream and if so the identity of this stream is recorded in sufficient detail to enable composing a new command for starting this stream, or for redirecting this stream (which is also included within the meaning of starting herein). In an embodiment, the information about the identity of the stream is sent to control circuit 18 and stored in a memory (not shown) in control circuit 18, which may be arranged to overwrite information about the Nth (n being an integer, e.g. five) most recently started stream. Alternatively, the information may be stored locally in display devices 10, or in stream sources 12, in combination with information about the time of recording.

If the command was the result of activation of the "most recent" button 160, step 24 is executed wherein the recorded information about the identities of already started streams are gathered. For example information about the N (where N equals five for example) most recently started streams is gathered. When the information is stored in control circuit 18, the information is sent to the display device that detected the signal from remote control device 16, which displays information about the streams (e.g. their names, a logo, and/or key frames). When the information about the started streams is stored in a distributed way, the information is gathered, for example by control circuit 18, or by the display device 10, from the different devices where information about previously started streams is recorded. The information about the started streams is sorted according to starting time and the information about the N most recently started streams is displayed.

In step 25 the display device 10 receives a selection command from the remote control device 16, which selects one of the streams about which information is displayed. A command is then formed for starting the selected stream, using the recorded information about the stream in a parameter of the command, to select the stream. The command is constructed to (re-)direct the stream to the display device 10 that detected that the "most second" signal was activated. This command is handled by proceeding from step 22. It will be understood that instead a series of commands may be generated, which create the same net effect.

It may be noted that the flow-chart of the figure has the effect that the selected stream is placed on top of the most recently started streams in this way, so that it can be easily selected when the "most recent" button is actuated again soon after. Alternatively the new start due to the "most recent" button is not recorded, so as to preserve the original order of starting.

The embodiments described so far provide for selection by the user from a most recently played list. As an alternative only the most recently started stream may be identified in step 24 and this stream may be used in step 25 to generate the command to start rendering of the stream at the display device 10 automatically. In this case no display and/or selection of the most recently started streams is needed.

Preferably, the display device 10 "takes over" the stream from a previous display device 10 that was rendering the stream when the "most recent" button 160 was actuated. That is, preferably the system is arranged to stop rendering of the selected stream at the previous display device 10 in response to actuation of the "most recent" button, or the subsequent selection of the selected stream from the most recently started streams. In this way, power is saved by stopping display when a user moves from one display device 10 to another. Moreover, the system is arranged to execute to subsequent commands concerning rendering (such as pause, fast forward, slow motion etc.) of the stream received at the new display device 10, whereas before takeover the system executes this type of command only from the previous display device 10. Also preferably rendering at the new display device 10 preferably starts from a point in the stream substantially (e.g. to within 1-10 seconds) from where the previous display device 10 leaves off. This occurs almost automatically when a broadcast stream is rendered.

In a further embodiment that start point lies a predetermined time interval (e.g. 10 seconds) before the point that at which the stream was rendered. That is, a recording medium is included in the system, which is arranged to record part of the stream for a time most recent time interval, e.g. in a circular buffer, and the recorded part of the stream data is supplied to the new display device 10 for rendering or, in case of a replay stream from a replay device, the replay point is set back by a corresponding amount. Thus, content that the user misses when moving from one room to another is replayed.

In another embodiment the stream is not stopped at the previous display device, or an additional button is provided on remote control device 16 to select between stopping and not stopping. In another embodiment an additional button is provided on the remote control device 16 to resume rendering of a stream that has been stopped in this way. Thus a plurality of viewers can continue to view the stream in a plurality of rooms.

Although an embodiment has been described wherein display devices are used for a video stream, it should be understood that alternatively a stream of still images may be rendered, which advances automatically, or in response to signals from remote control device. In another alternative the system is applied to audio streams, using loudspeakers instead of at least part of display devices 10. In this case the system may be arranged to render a list of most recent streams as successive sounds for selection of a stream, or the most recently started stream may be selected automatically.

Although embodiments have been shown wherein the receiver 100 has been incorporated in (or attached to) the display device 10 (or in a loudspeaker unit that replaces it), it will be understood that alternatively a separate receiver may be used, as long as there is an association between the receiver and the rendering device (display device or loudspeaker unit) for example because they are in the same room, or because pointing the remote control device 16 at the rendering devices also points the remote control device 16 at the rendering device.

Variations and modifications of the described embodiment are possible within the scope of the inventive concept. For example, in one embodiment, the system according to the present invention comprises a service provider with the control structure 18 and a client unit with the remote control 16. The system may also comprise devices that are geographically distributed and remotely located from each other.

The processor may execute a software program to enable the execution of the steps of the method of the present invention. The software may enable the system of the present invention independently of where it is being run. To enable the system, the processor may transmit the software program to the other (external) devices, for example. The independent method claim and the computer program product claim may be used to protect the invention when the software is manufactured or exploited for running on the consumer electronics products. The devices in the system may be connected using existing technologies, such as Blue-tooth, IEEE 802.11 [a-g], etc. The devices may interact in accordance with the UPnP (Universal Plug and Play) standard.

A "computer program" is to be understood to mean any software product stored on a computer-readable medium, such as a floppy disk, downloadable via a network, such as the Internet, or marketable in any other manner. The various program products may implement the functions of the system and method of the present invention and may be combined in several ways with the hardware or located in different devices. The invention can be implemented by means of hardware comprising several distinct elements, and by means of a suitably programmed computer. In the device claim enumerating several means, several of these means can be embodied by one and the same item of hardware.

I claim:

1. A distributed content rendering system, comprising:
   at least one stream source for simultaneously sourcing a plurality of content streams;
   a plurality of rendering devices configured to render the plurality of simultaneously sourced content streams;
   detection circuits on respective rendering devices of the plurality of rendering devices configured to detect at least a first of a plurality of control signals;
   a control structure configured to direct a most recently viewed of the plurality of simultaneously sourced content streams to at least one of the plurality of rendering devices that detected the first control signal; and
   a distributed communication structure configured to couple the plurality of rendering devices to the stream source sourcing the most recently viewed content stream and to the control structure,
   wherein the control structure is configured to:
      gather, via the distributed communication structure, control information for content streams which have been started prior to the first control signal being detected, on the respective rendering devices of the plurality of rendering devices including on the one rendering device that detected the first control signal, and
   in response to the detected first control signal, cause a list of the content streams previously started on the respective rendering devices of the plurality of rendering devices including the one rendering device that detected the first control signal, to be rendered at the one rendering device that detected the first control signal,
   wherein the plurality of control signals comprise a selection control signal indicating a user selection of a selected one of the listed content streams,
   wherein the control structure is configured to render a selected one of the list of previously started content streams, under control of the selection signal, on the one rendering device.

2. The distributed content rendering system according to claim 1, further comprising a control device for providing the plurality of control signals including the first control signal to control at least one of the plurality of rendering devices.

3. The distributed content rendering system according to claim 2, wherein the control device is portable.

4. The distributed content rendering system according to claim 2, wherein the control device is a handheld remote control device comprising a most recent button for generating the first control signal.

5. The distributed content rendering system according to claim 1, wherein the control structure is configured to stop rendering of the one content stream on another one of the plurality of rendering devices that was rendering the one content stream in response to the selection signal being detected on the one rendering device which detected the first control signal.

6. The distributed content rendering system according to claim 1, wherein the at least one stream source comprises a plurality of stream sources for sourcing the plurality of content streams.

7. The distributed content rendering system according to claim 1, wherein the control structure is configured to automatically render a content stream most recently started on any of the plurality of rendering devices via the distributed communication structure in response to detection of the first control signal.

8. The distributed content rendering system according to claim 1, wherein the control structure is further configured to start rendering the one content stream at the one rendering device at a point of rendering a period of time from which the one content stream was previously rendered in response to the selection signal.

9. The distributed content rendering system according to claim 8, wherein the period of time is a period of time before a point at which the one content stream was previously rendered.

10. A control structure for a distributed content rendering system, the control structure comprising:
- a distributed communication structure configured to couple the control structure:
  - to a plurality of rendering devices configured to render a plurality of simultaneously sourced content streams, respective rendering devices of the plurality of rendering devices having respective detection circuits configured to detect at least a first of a plurality of control signals, and
  - to a stream source configured to simultaneously source the plurality of content streams,
- the control structure is configured to direct a most recently viewed content stream of the plurality of simultaneously sourced content streams to at least one of the plurality of rendering devices which detected the first control signal, and gather control information for content streams which have been started prior to the first control signal being detected, on the respective rendering devices of the plurality of rendering devices including on the one rendering device that detected the first control signal and in response to the detected first control signal, cause a list of the content streams previously started on the respective rendering devices of the plurality of rendering devices including the one rendering device that detected the first control signal to be rendered at the one rendering device that detected the first control signal,
- the plurality of control signals comprising a selection control signal indicating a user selection from the listed content streams,
- wherein the control structure is configured to render a selected one of the list of previously started content streams, under control of the selection signal.

11. A method of operating a distributed content rendering system, the method comprising acts of:
- providing at least one stream source for simultaneously sourcing a plurality of content streams;
- rendering the plurality of simultaneously sourced content streams on a plurality of rendering devices;
- detecting on respective rendering devices at least a first of a plurality of control signals;
- directing a most recently viewed of the plurality of simultaneously sourced content streams to at least one of the plurality of rendering devices which detected the first control signal;
- coupling the plurality of rendering devices to the stream source sourcing the most recently viewed content stream;
- gathering via the distributed communication structure control information for content streams which have been started prior to the first control signal being detected, on the plurality of respective rendering devices of the plurality of rendering devices including the one rendering device that detected the first control signal and in response to the detected first control signal,
- causing a list of the content streams previously started on the respective rendering devices of the plurality of rendering devices including the one rendering device that detected the first control signal, to be rendered at the one rendering device which detected the first control signal,
- the plurality of control signals comprising a selection control signal indicating a user selection from the list of previously started content streams, of one content stream, and
- rendering the one content stream under control of the selection control signal.

12. A computer program embodied on a computer readable storage-memory that is not a propagating wave or signal, configured to control including a method of operating a distributed content rendering system, the method comprising acts of:
- providing at least one stream source for simultaneously sourcing a plurality of content streams;
- rendering the plurality of simultaneously sourced content streams on a plurality of rendering devices;
- detecting on respective rendering devices at least a first of a plurality of control signals;
- directing a most recently viewed of the plurality of simultaneously sourced content streams to at least one of the plurality of rendering devices, which detected the first control signal;
- coupling the plurality of rendering devices to the stream source sourcing the most recently viewed content stream;
- gathering via the distributed communication structure control information for control streams which have been started prior to the first control signal being detected, on the plurality of rendering devices including the one rendering device that detected the first control signal and in response to the detected first control signal,
- causing a list of the content streams previously started on each of the plurality of rendering devices including the one rendering device that detected the first control signal, to be rendered at the one rendering device that detected the first control signal, the plurality of control signals having a selection signal,
- the selection signal indicating a user selection from the list of previously started content streams, of one content stream, and
- rendering the selected content stream under control of the selection signal.

* * * * *